(12) United States Patent
Dayan et al.

(10) Patent No.: US 8,332,620 B2
(45) Date of Patent: Dec. 11, 2012

(54) SYSTEM, METHOD AND COMPUTER PROGRAM PRODUCT FOR EXECUTING A HIGH LEVEL PROGRAMMING LANGUAGE CONDITIONAL STATEMENT

(75) Inventors: Uri Dayan, Hertzelia (IL); Aviram Amir, Petach-Tikva (IL); Itzhaki Barak, Kadima (IL); Shahar Nahum, Ashdod (IL); Idan Rozenberg, Raanana (IL); Ron Shaposhnikov, Kiriat Shmona (IL); Erez Steinberg, Tel-Aviv (IL)

(73) Assignee: Freescale Semiconductor, Inc., Austin, TX (US)

( * ) Notice: Subject to any disclaimer, the term of this patent is extended or adjusted under 35 U.S.C. 154(b) by 593 days.

(21) Appl. No.: 12/179,791

(22) Filed: Jul. 25, 2008

(65) Prior Publication Data
US 2010/0023734 A1 Jan. 28, 2010

(51) Int. Cl.
*G06F 9/00* (2006.01)
(52) U.S. Cl. ...................................... 712/224
(58) Field of Classification Search .................. None
See application file for complete search history.

(56) References Cited

U.S. PATENT DOCUMENTS

| | | | |
|---|---|---|---|
| 5,555,428 A | 9/1996 | Radigan et al. | |
| 5,872,964 A * | 2/1999 | Ishiguro et al. | 712/234 |
| 6,986,025 B2 | 1/2006 | Wilson | |
| 7,178,011 B2 | 2/2007 | Seal et al. | |
| 7,234,043 B2 | 6/2007 | Blasco Allue et al. | |
| 2004/0250051 A1 | 12/2004 | Seal et al. | |
| 2008/0313443 A1 * | 12/2008 | Terashima | 712/234 |

* cited by examiner

*Primary Examiner* — Jacob A Petranek

(57) ABSTRACT

A method for executing an instruction, the method includes: executing a compare and configure mask instruction, wherein the executing comprises: performing a comparison to provide a comparison result; and configuring, in response to the comparison result, a multiple bit mask that is stored in a multiple-purpose register; wherein all bits of the multiple bit mask are configured to have the same value; and applying an algorithmic operation on the multiple bit mask to provide an algorithmic operation result; wherein the algorithmic operation result represents an outcome of a high level programming language conditional statement.

20 Claims, 3 Drawing Sheets

| Instruction type field 92 | Comparison type field 93 | Multiple purpose mask storing register field 94 | Comparison related field 96 | Comparison related field 98 |
|---|---|---|---|---|

SYSTEM, METHOD AND COMPUTER PROGRAM PRODUCT FOR EXECUTING A HIGH LEVEL PROGRAMMING LANGUAGE CONDITIONAL STATEMENT

FIELD OF THE INVENTION

This disclosure relates generally to a system, a method and a computer program product for executing a high level programming language conditional statement.

BACKGROUND OF THE INVENTION

Conditional statements perform different computations or actions depending on whether one or more conditions were fulfilled or not. Typically, such a conditional statement is achieved by selectively altering a control flow of a program.

Modern integrated circuits execute conditional statements by various manners, including but not limited to using dedicated predicates. For example, registers can be directly used as predicates. A direct usage of registers as predicates includes allocating a dedicated field in an instruction for selecting one register out of a group of registers that can act as predicates. This group of registers includes few register because the allocation of such a dedicated field within an instruction is very costly in encoding space.

Another manner for executing conditional statements includes allocating one or more bits of a status register as a conditional flag (also known as a true flag) that indicates whether a condition has been fulfilled or not. Some integrated circuits include a single true flag. The usage of such flags is also very costly in encoding space.

The increasing complexity of modern software increases the number of conditional statements and their complexity and elevated the importance of the efficient execution of these conditional statements.

SUMMARY OF THE PRESENT INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

FIG. 2 schematically shows an example of an embodiment of a compare and mask configure instruction.

DETAILED DESCRIPTION OF THE DRAWINGS

In the following specification, the invention will be described with reference to specific examples of embodiments of the invention. It will, however, be evident that various modifications and changes may be made therein without departing from the broader spirit and scope of the invention as set forth in the appended claims.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

It has been shown that an execution of a compare and mask configure instruction and especially a generation of a mask, an algorithmic operation result and a selection of operations can simplify an execution of some conditional statements. Executing the mentioned above operations can be highly effective in systems (such as processors) that have a single true bit or otherwise a limited number of dedicated predicates.

It has been shown that the compare and mask configure instruction enables an efficient execution of complex control sequences that may include multiple conditions. Multiple masks can be generated and multiple algorithmic operations can be applied on these masks in order to select between operations to execute.

The compare and mask configure instruction does not require to allocate multiple encoding bits that indicate which dedicated predicate to use, and does not require bit-specific operations.

In systems that use the compare and mask configure instruction instead of having dedicated predicates there is no need to provide high fan-out predication flags that store the dedicated predicates.

The execution of the compare and mask configure instruction involves writing a comparison result to a multiple purpose register. The comparison result can be written to any multiple purpose register because these registers are not used to predicate instructions directly.

Figure 1:
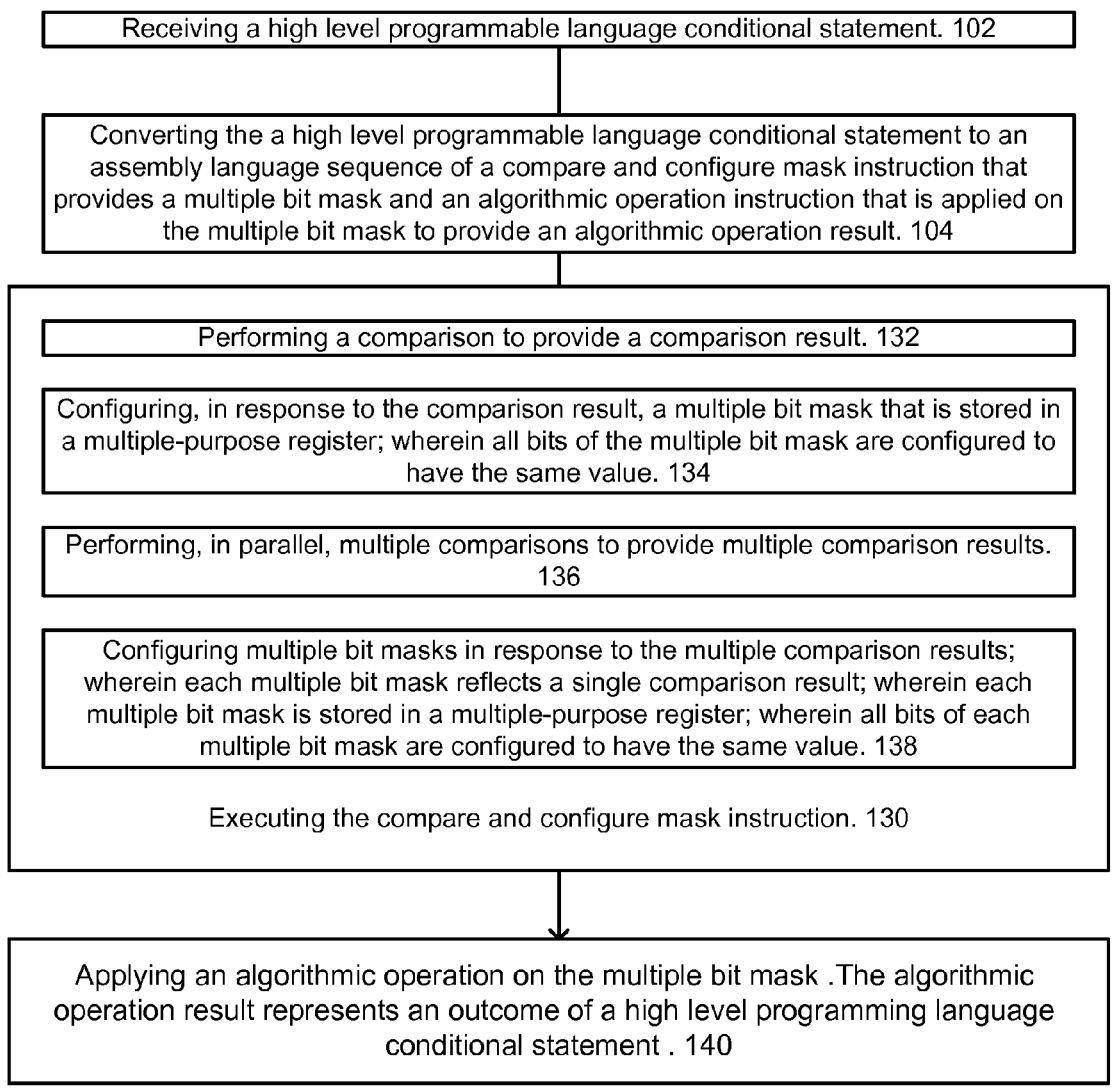
FIG. 1 schematically shows a flow chart of an example of an embodiment of a method.

Referring to the example set fourth in FIG. 1, method 100 starts by a stage of fetching (not shown) a compare and mask configure instruction and then fetching an arithmetic operation instruction. The fetching is followed by decoding (not shown) the compare and configure a mask instruction and the arithmetic operation instruction.

These fetching and decoding stages are followed by stage 130 of executing the compare and configure mask instruction.

Stage 130 of executing includes stage 132 of performing a comparison to provide a comparison result and stage 134 of configuring, in response to the comparison result, a multiple bit mask that is stored in a multiple-purpose register; wherein all bits of the multiple bit mask are configured to have the same value.

Stage 130 can be followed by stage 140 of applying an algorithmic operation on the multiple bit mask to provide an algorithmic operation result. The algorithmic operation result represents an outcome of a high level programming language conditional statement. Thus, the execution of stages 110, 120, 130 and 140 implements a high level programming language conditional statement. The algorithmic operation result is the outcome of that conditional statement and is obtained without a change of flow.

Stage 130 can be preceded by a compiling stage. Thus, Method 100 can include stage 102 of receiving a high level programmable language conditional statement and stage 104 of converting it to an assembly language sequence of a compare and configure mask instruction that provides a multiple bit mask and an algorithmic operation instruction that is applied on the multiple bit mask to provide an algorithmic operation result. Stages 102 and 104 can be executed in real time or off-line.

It is noted that method 100 can be executed by a system that can perform multiple comparisons in parallel. Such a parallel execution can be triggered by several compare and configure a mask instructions that can be associated with different conditions to be evaluated or from software pipelined loop iterations.

In this case stage 130 can include stage 136 of performing, in parallel, multiple comparisons to provide multiple comparison results, and stage 138 of configuring multiple bit masks in response to the multiple comparison results; wherein each multiple bit mask reflects a single comparison result; wherein each multiple bit mask is stored in a multiple-purpose register; wherein all bits of each multiple bit mask are configured to have the same value.

If more than one multiple bit mask is deemed to be relevant then method 100 can also include applying at least one algorithmic operation on at least two multiple bit masks. Stage 140 can include applying at least one algorithmic operation on at least two multiple bit masks to provide at least one algorithmic operation result. Thus, complex conditional statements—those who are dependent upon multiple comparisons, can be implemented by performing multiple comparisons and applying one or more arithmetic operations of the multi bits masks to generate an outcome of the complex conditional statements. For example, in a processor that can perform four comparisons in parallel a complex conditional statement can be calculated by performing four comparisons in parallel and them applying arithmetic operations on the comparison results and on arithmetic operation results.

Method 100 can be executed by various types of processors, including but not limited to processors that have a single true flag, processors that have a limited number of dedicated predicates. The number of dedicated predicates is limited in the sense that there can be a need to support more conditions than can be supported by these dedicated predicates. A dedicated predicate can be a status bit, a dedicated status register and the like.

Referring to the example set fourth in FIG. 2, compare and mask configure instruction 90 includes various fields such as: (i) instruction type field 92 (indicating that the instruction is a compare and mask configure instruction), (ii) comparison type field 93 that indicates which type of comparison to perform—equalization, greater than, not greater than, smaller than, not smaller than, not equal, (iii) multiple purpose mask storing register field (also referred to as mask destination register) 94 indicative of the multiple purpose register that stores the multiple bit mask; (iv) comparison operand fields 96 and 98. These fields store information indicative of operands to be compared during the comparison operation. A comparison operand can be either a constant, an address of a register that stores a variable, an address of a register that stores an address of the variable, a memory address of a variable or constant, and the like.

Figure 3:
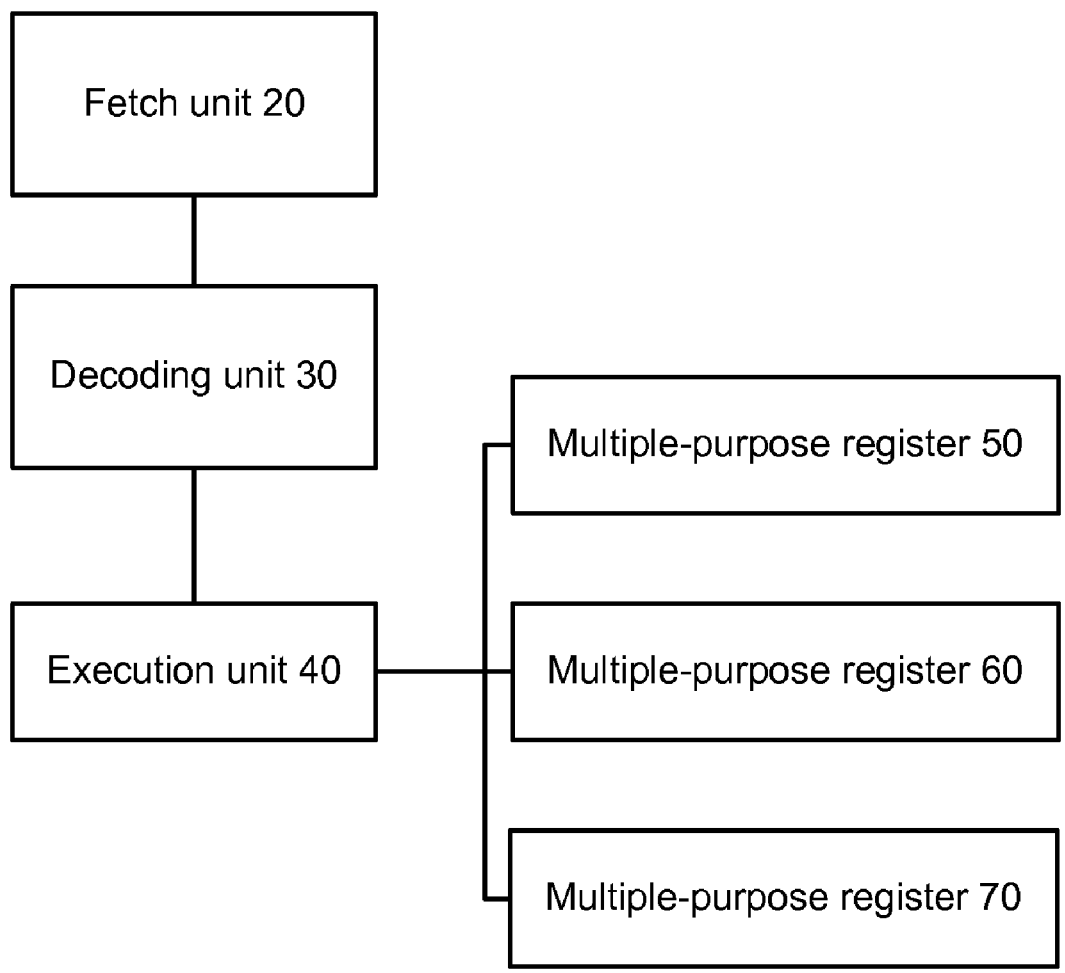
FIG. 3 schematically shows an example of an embodiment of a system.

Referring to the example set forth in FIG. 3, system 10 includes fetch unit 20, decoding unit 30, execution unit 40 and various multiple-purpose registers 50, 60 and 70. These various units can facilitate a pipelined execution of instructions.

System 10 can be a processor, an integrated circuit or can include one or more integrated circuits.

Fetch unit 20 is adapted to fetch various instructions such as but not limited to a compare and mask configure instruction such as compare and mask configure instruction 90 of FIG. 2. It is also adapted to fetch an algorithmic operation instruction that follows the compare and mask configure instruction.

Decoding unit 30 is adapted to decode various instructions including but not limited to the compare and configure a mask instruction. It is also adapted to decode an algorithmic operation instruction that follows the compare and mask configure instruction.

Execution unit 40 is adapted to execute various instructions, such as but not limited to, the compare and configure mask instruction and the algorithmic operation instruction that follows the compare and mask configure instruction.

The execution of the compare and configure mask instruction includes: (a) performing a comparison to provide a comparison result; and (b) configuring, in response to the comparison result, a multiple bit mask that is stored in a multiple-purpose register; wherein all bits of the multiple bit mask are configured to have the same value.

For example, if the comparison fails (for example, a tested presumption is not fulfilled) all bits of the multiple bit mask can be set to '1' and if the comparison succeeds (for example, a tested presumption is fulfilled) all bits of the multiple bit mask can be set to '0'. It is noted that this is not necessarily so and '1' can indicate that the comparison failed while '0' can indicate that the comparison succeeded.

The multiple bit mask can be stored in any register out of multiple-purpose registers 50, 60 and 70.

Execution unit 40 can be an arithmetic logic unit (ALU), but this is not necessarily so. It can apply an algorithmic operation (such as AND, NAND and XOR) on the multiple bit mask.

Execution unit 40 can perform a conditional statement by applying an algorithmic operation on the multiple bit mask. This is illustrated by the following high level programming language code and assembly code. Both compare variable A to ten and assign a value of variable C to variable B if variable A is greater than ten. Else, variable B is set to zero.

The high level programming language code includes:
if (A>10) then {B=C},
else {B=0}.
The assembly code includes:
cmpgtd #10, d0, d3;
tfr d1, d2;
and d2, d3.

It is assumed when the assembly code is executed multiple purpose register d0 stores variable A, register d1 stores variable C and register d2 stores variable B.

The assembly code starts by a compare and mask configure instruction (denoted cmpgtd) that compares variable A to ten and configures a multiple bit mask stored in multiple purpose register d3 according to the comparison result. It is assumed that if variable A is greater than ten the multiple bit mask will equal a sequence of '1' bits, else it will equal a sequence of '0' bits.

The second line of the assembly code includes a transfer instruction (denoted tfr) in which variable C is written to general purpose register d2 (that previously stored variable B).

The third line of the assembly code includes an AND operation between the multiple bit mask and variable C (stored in general purpose register d2). The result of this AND operation (variable C if the comparison succeeded or zero if the comparison failed) is stored in multiple purpose register d2.

System 10 can include multiple execution units that are adapted to perform, in parallel, multiple comparisons to provide multiple comparison results; and to configure multiple bit masks in response to the multiple comparison results; wherein each multiple bit mask reflects a single comparison result; wherein each multiple bit mask is stored in a multiple-purpose register; wherein all bits of each multiple bit mask are configured to have the same value. At least one execution unit can apply at least one algorithmic operation on at least two multiple bit masks. At least one execution unit can perform a conditional process operation that is responsive to values of at least two multiple bit masks.

If more than one multiple bit mask is deemed to be relevant then system 10 can applying at least one algorithmic operation on at least two multiple bit masks. Accordingly, execution unit can apply at least one algorithmic operation on at least two multiple bit masks to provide at least one algorithmic operation result. Thus, complex conditional statements—those who are dependent upon multiple comparisons, can be implemented by performing multiple comparisons and applying one or more arithmetic operations of the multi bits masks to generate an outcome of the complex conditional statements. For example, if system 10 can perform four comparisons in parallel a complex conditional statement can be calculated by performing four comparisons in parallel and them applying arithmetic operations on the comparison results and on arithmetic operation results.

The architecture of the StarCore processors of Freescale provides processors that are capable of performing multiple comparisons in parallel.

System 10 can have a single true flag or only a limited number of dedicated predicates.

A computer program product is provided. It includes a computer readable medium that stores instructions for: executing a compare and configure mask instruction, wherein the executing comprises: performing a comparison to provide a comparison result; and configuring, in response to the comparison result, a multiple bit mask that is stored in a multiple-purpose register; wherein all bits of the multiple bit mask are configured to have the same value; and applying an algorithmic operation on the multiple bit mask to provide an algorithmic operation result; wherein the algorithmic operation result represents an outcome of a high level programming language conditional statement.

The computer program product can also store instructions for: performing, in parallel, multiple comparisons to provide multiple comparison results; and configuring multiple bit masks in response to the multiple comparison results; wherein each multiple bit mask reflects a single comparison result; wherein each multiple bit mask is stored in a multiple-purpose register; wherein all bits of each multiple bit mask are configured to have the same value.

The computer program product can also store instructions for applying at least one algorithmic operation on at least two multiple bit masks to provide at least one algorithmic operation result.

The computer program product can also store instructions for receiving a high level programmable language conditional statement and converting it to an assembly language sequence of a compare and configure mask instruction that provides a multiple bit mask and an algorithmic operation instruction that is applied on the multiple bit mask to provide an algorithmic operation result.

It has been shown that by using the compare and configure mask instruction the following code was executed in 25% less cycles than when using other instructions that were able to set a singe true bit. The code includes the following high level language instructions:

```
for(i = 0; i<val1; i++)
{
  if ( i > val2[i] )
    res1 = 8;
```

```
  else
    res1 = 0;
  if ( i>val3[i] )
    res2 = 9;
  else
    res2 = 0;
}
```

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

The word 'comprising' does not exclude the presence of other elements or steps then those listed in a claim.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for executing an instruction, the method comprising:

executing by a processor a compare and configure mask instruction, wherein the executing comprises:

performing a comparison to provide a comparison result;

determining a bit value as a representation of the comparison result; and writing the representation of the comparison result to each bit of a multiple bit mask that is stored in a plurality of bits of a multiple-purpose register, thereby duplicating the bit value in each bit of the multiple bit mask; and applying by the processor an algorithmic operation on the multiple bit mask to provide an algorithmic operation result; wherein the algorithmic operation result represents an outcome of a high level programming language conditional statement.

2. The method according to claim 1 comprising:

performing, in parallel, multiple comparisons to provide multiple comparison results; and configuring multiple bit masks in response to the multiple comparison results; wherein each multiple bit mask reflects a single comparison result; wherein each multiple bit mask is stored in a multiple-purpose register; wherein all bits of each multiple bit mask are configured to have the same value.

3. The method according to claim 2 comprising applying at least one algorithmic operation on at least two multiple bit masks to provide at least one algorithmic operation result.

4. The method according to claim 1 comprising fetching the compare and mask configure result by a processor that has a single true flag.

5. The method according to claim 1 comprising fetching the compare and mask configure result by a processor that has a limited number of dedicated predicates.

6. The method according to claim 1 comprising receiving a high level programmable language conditional statement and converting it to an assembly language sequence of a compare and configure mask instruction that provides a multiple bit mask and an algorithmic operation instruction that is applied on the multiple bit mask to provide an algorithmic operation result.

7. A system that comprises:

an execution unit, adapted to execute a compare and configure mask instruction that is followed by an algorithmic operation instruction by:

performing a comparison to provide a comparison result;

determining a bit value as a representation of the comparison result;

writing the representation of the comparison result to each bit of a multiple bit mask that is stored in a plurality of bits of a multiple-purpose register, thereby duplicating the bit value in each bit of the multiple bit mask; and applying an algorithmic operation on the multiple bit mask to provide an algorithmic operation result; wherein the algorithmic operation result represents an outcome of a high level programming language conditional statement.

8. The system according to claim 7 comprising multiple execution units adapted to perform, in parallel, multiple comparisons to provide multiple comparison results; and to configure multiple bit masks in response to the multiple comparison results; wherein each multiple bit mask reflects a single comparison result; wherein each multiple bit mask is stored in a multiple-purpose register; wherein all bits of each multiple bit mask are configured to have the same value.

9. The system according to claim 8 wherein at least one execution unit is adapted to apply at least one algorithmic operation on at least one algorithmic operation result.

10. The system according to claim 7 comprising a single true flag.

11. The system according to claim 7 comprising a limited number of dedicated predicates.

12. The system according to claim 7 comprising a compiler adapted to receive a high level programmable language conditional statement and convert it to an assembly language sequence of a compare and configure mask instruction that provides a multiple bit mask and an algorithmic operation instruction that is applied on the multiple bit mask to provide an algorithmic operation result.

13. A computer program product that comprises a non-transitory computer readable medium that stores instructions for:

executing a compare and configure mask instruction, wherein the executing comprises:

performing a comparison to provide a comparison result;

determining a bit value as a representation of the comparison result; and writing the representation of the comparison result each bit of a multiple bit mask that is stored in a plurality of bits of a multiple-purpose register, thereby repeating the bit value in each bit of the multiple bit mask; and applying an algorithmic operation on the multiple bit mask to provide an algorithmic operation result; wherein the algorithmic operation result represents an outcome of a high level programming language conditional statement.

14. The computer program product according to claim 13 wherein the non-transitory computer readable medium further stores instructions for:

performing, in parallel, multiple comparisons to provide multiple comparison results; and configuring multiple bit masks in response to the multiple comparison results; wherein each multiple bit mask reflects a single comparison result; wherein each multiple bit mask is stored in a multiple-purpose register; wherein all bits of each multiple bit mask are configured to have the same value.

15. The computer program product according to claim 14 wherein the non-transitory computer readable medium further stores instructions for applying at least one algorithmic operation on at least two multiple bit masks to provide at least one algorithmic operation result.

16. The computer program product according to claim 13 wherein the non-transitory computer readable medium further stores instructions for receiving a high level programmable language conditional statement and converting it to an assembly language sequence of a compare and configure mask instruction that provides a multiple bit mask and an algorithmic operation instruction that is applied on the multiple bit mask to provide an algorithmic operation result.

17. The computer program product of claim 13 wherein the non-transitory computer readable medium further stores instructions for indicating a type of comparison to perform.

18. The computer program product of claim 17 wherein the type of comparison is selected from a group consisting of equalization, greater than, not greater than, smaller than, not smaller than, and not equal.

19. The computer program product of claim 13 wherein the non-transitory computer readable medium further stores instructions for setting a single true flag.

20. The computer program product of claim 13 wherein the non-transitory computer readable medium further includes instructions for storing a limited number of dedicated predicates.

* * * * *